Figure 1:
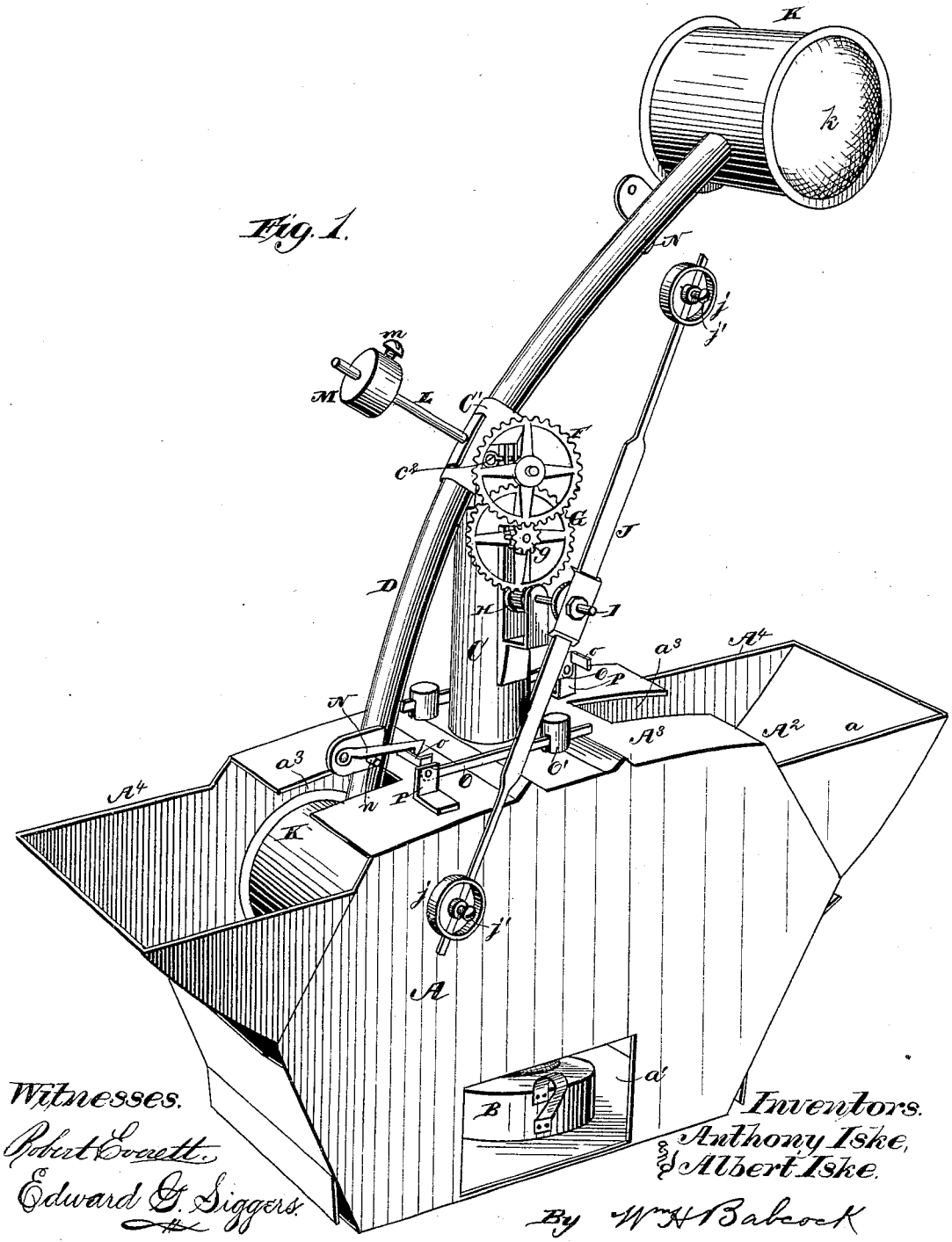

(No Model.) 2 Sheets—Sheet 1.

A. & A. ISKE.
OSCILLATING MOTOR.

No. 271,639. Patented Feb. 6, 1883.

Witnesses.
Robert Everett.
Edward G. Siggers.

Inventors.
Anthony Iske,
& Albert Iske.
By W. H. Babcock
Atty.

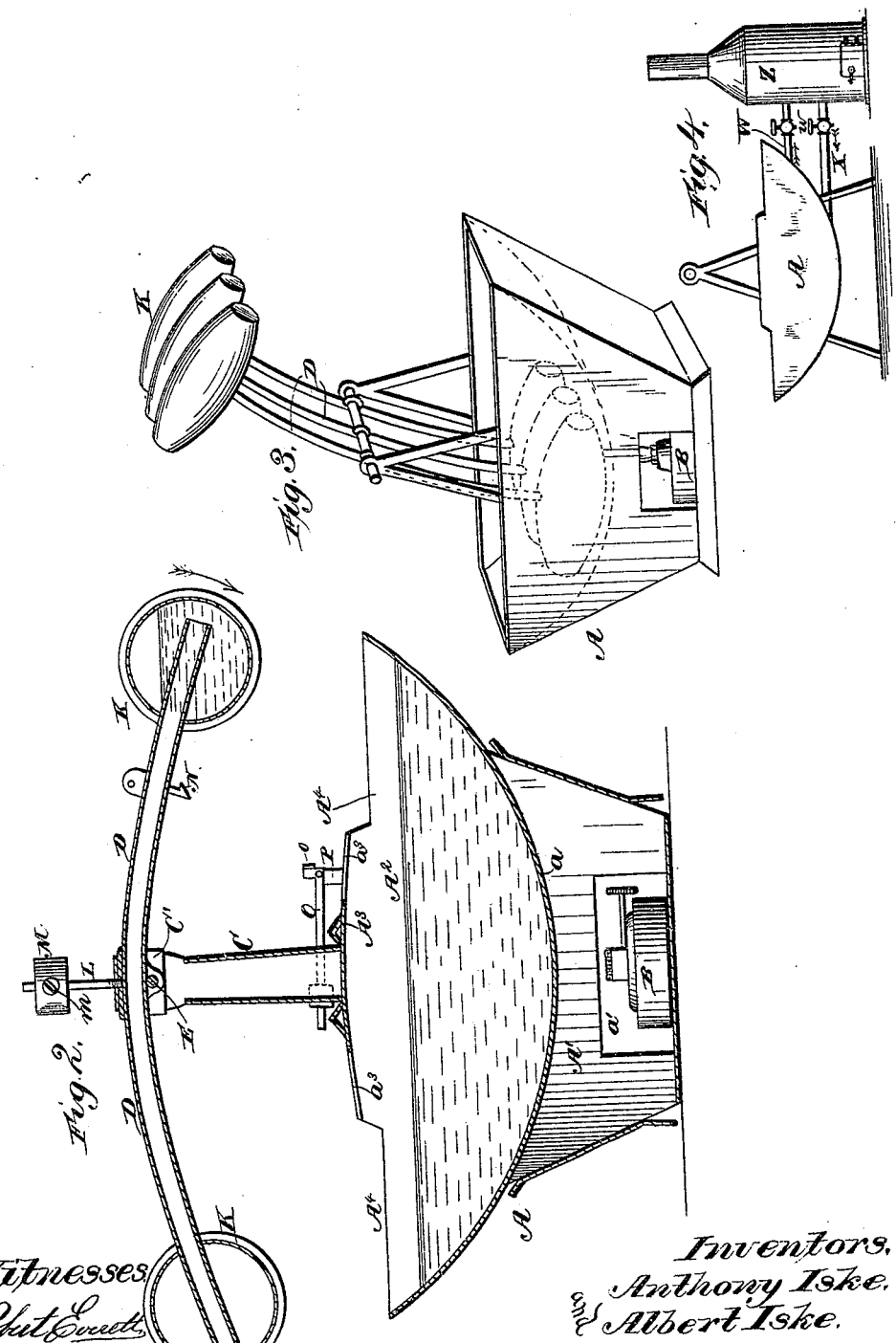

United States Patent Office.

ANTHONY ISKE AND ALBERT ISKE, OF LANCASTER, PENNSYLVANIA.

OSCILLATING MOTOR.

SPECIFICATION forming part of Letters Patent No. 271,639, dated February 6, 1883.

Application filed June 29, 1882. (No model.)

*To all whom it may concern:*

Be it known that we, ANTHONY ISKE and ALBERT ISKE, citizens of the United States, residing at Lancaster, in the county of Lancaster and State of Pennsylvania, have invented certain new and useful Improvements in Motors; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is an improvement on Letters Patent No. 253,868, granted to us February 21, 1882. Said patent describes and claims a motor consisting of an oscillating tube having at each end a receptacle for volatile liquids, and a cover, in combination with a calorific chamber provided with an entrance for the admission of said receptacles, each entrance being adapted to be closed by the appropriate cover after the receptacle has entered.

The object of our present invention is chiefly to adapt these motors, which have rigid oscillating tubes, to operate reliably in connection with tanks of hot or warm liquid, into which their terminal bulbs or receptacles dip alternately.

As shown in one or more of our prior patents, it is not broadly new to use warm water for causing motors to operate on this principle, and the combination of a rigid oscillating tube with a tank of warm water, into which its receptacles dip for the same purpose, has also been fully shown and described in one or more of our prior patents on this class of motors. We have found, however, a serious obstacle in the resistance of the water or other heated fluid employed, which tends to expel each receptacle before it has become sufficiently heated. To guard against this we employ additional devices, hereinafter described and claimed, for holding each receptacle in its lowest position until heated sufficiently by immersion in the warm water.

In the accompanying drawings, Figure 1 represents a perspective view of our improved motor embodying the present invention. Fig. 2 represents a longitudinal central section of the same. Fig. 3 represents a perspective view of a modification, and Fig. 4 represents an arrangement for supplying hot water to the tank.

A represents the casing which supports our motor, and which contains a lower heating-chamber, A', and an upper chamber or tank, $A^2$, for warm water, the two being separated by a partition or diaphragm, $a$. A door, $a'$, allows the insertion and removal of a calorific device, B, into or from the former. The top $A^3$ of this casing is made short, so as to leave uncovered the top of the end pieces or extensions, $A^4$, at the sides of the tank. These end pieces form passages through which the bulbs or receptacles hereinafter referred to move in entering and leaving the tank. The ends of top $A^3$ are constructed with inwardly-extending slots $a^3$, which allow the inward vibration of the rigid tube hereinafter described, the end of each slot determining the inward limit of motion of each receptacle.

From the middle of casing-top $A^3$ rises a standard, C, which is bifurcated at top to receive a rigid tube, D, which is provided at this point with a rigidly-attached saddle-shaped plate, C'. A shaft, E, passes through the bifurcated top of this standard and through the depending ears of this plate, and serves as a pivot-rod for said tube, it being attached to the ears of plate C', so as to move therewith. This shaft turns freely in the bifurcated top of the standard, but is held detachably thereto by pins $c^2$ or other suitable fastenings. This shaft is provided with a gear-wheel, F, that turns therewith, and this gear-wheel meshes with a pinion, $g$, on the hub of a second gear-wheel, G, which turns on a stud projecting from a bracket attached to the standard, as shown, or from the standard itself. Wheel G in its turn gears with a pinion or lantern wheel, H, on a shaft, I, which carries at its outer end a long transverse bar, J, weighted at both ends.

The tube D curves downwardly at both ends, and is provided with terminal receptacles K for volatile liquid. The receptacles and tube are exhausted of air and hermetically sealed after being partly filled with said liquid. As shown in some of our earlier patents, each end of the tube is extended into and nearly through the receptacle attached thereto. The downward curvature of the ends of the tube insures the entire submergence of each receptacle when it enters the tank. When the tube comes into contact with the casing-top $A^3$ and is stopped thereby, the weighted bar tends, by reason of its momentum, to continue rotating in the same direction, and thereby holds said tube against the said top of the casing and the lower receptacle in its position of perfect submergence until said receptacle is heated sufficiently to force the volatile liquid in the usual manner over into the other receptacle, which will then descend in its turn. Instead of this doubly-weighted bar J, we may use two weighted arms, or a weighted wheel, or a balance or fly wheel.

The weights $j\ j$ are made adjustable on the bar by means of a transverse slot or groove formed in each of them to receive the diminished end of said bar, and a set-screw, $j'$, which works in a threaded hub of each weight and bears against the bar. Any equivalent adjusting devices will suffice.

From the middle of plate $C'$ arises a rod, L, on which a weight, M, is adjustable by means of screw $m$. When the receptacles K are in the same horizontal plane the said weight is directly over the pivot-point of the tube, and of course exerts no influence in either direction. As each bulb descends the weight M inclines the same way with increasing leverage. Of course it tends to hold said receptacle in its position of greatest submergence. Thus this weight and the weighted bar or arm before described combine to effect the same result by cumulative action, although either may be used without the other. The adjusting devices hereinbefore referred to enable us to regulate with nicety the degree of power applied.

We also employ another device which has the same general object. N designates a hook, which is pivoted to the tube D, near one end thereof, and O represents a bar, which is pivoted to a small standard, P, on top $A^3$, and provided with a laterally-extending tail, $o$, arranged and adapted to engage with said hook, the lower face of the hook being inclined to make automatic engagement practicable. A stud, $n$, prevents said hook from rising too far. The bar O is provided with an adjustable weight, $O'$, which may easily be regulated so that it can be overcome and lifted by the downward motion of the nearer end of the tube, which forces the above-mentioned inclined face of the hook against the tail or flange. When the hook has ridden over the tail the said weight $O'$ causes the said tail to rise behind the hook and interlock with it sufficiently to resist the action of the warm liquid of the tank in expelling or tending to expel said receptacle. When the receptacle rises the weight of the other receptacle draws on said hook and frees it from said tail or flange, allowing the further ascent of said receptacle without impediment. Each end of the tube is provided with a hook and stud, as above described, and the weighted bars for engaging therewith are correspondingly arranged below.

As shown in these drawings, we make each receptacle with a bulge, $k$, at each end, to contain an additional quantity of vaporizable liquid. Of course any form of receptacle may be used with the other devices employed.

In Fig. 3 we have shown a series of tubes, D, arranged on a common shaft, and having their terminal receptacles K arranged to dip into the same tank. These receptacles have an elongated form. By using a series of receptacles arranged side by side we are enabled to employ a much shallower tank for doing the same work, since each of the receptacles thus employed in series will necessarily have a much less diameter than a single receptacle capable of holding a quantity of volatile liquid equal to their aggregate capacity.

In Fig. 4 a boiler, Z, is used for supplying hot water to the tank through a lower pipe, X. The same afterward returns from the tank to the boiler through an upper pipe, W. Cocks or valves $w$ in these pipes control the circulation of the heated liquid.

Having thus fully described our invention, what we claim as new, and desire to secure by Letters Patent, is—

1. An oscillating tube having at each end a receptacle for volatile liquid, in combination with a tank for warm liquid, into which said receptacles alternately dip, and a rotating weighted bar or fly-wheel, which operates to hold each receptacle in its position of complete submergence until sufficiently heated.

2. An oscillating tube having at each end a receptacle for volatile liquid, in combination with a tank for warm liquid, into which said receptacles dip alternately, and a weighted rod rising from the point of oscillation and inclining with the tube in either direction, substantially as set forth.

3. An oscillating tube having at each end a receptacle for volatile liquid, in combination with a tank for warm liquid, into which said receptacles alternately dip, and automatically engaging and disengaging catches which hold each receptacle in its position of complete submergence until sufficiently heated.

4. An oscillating tube having both its ends bent down and each of them provided with a receptacle for volatile liquid, in combination with a tank of warm liquid, said devices being arranged to insure the passage of the receptacles below the surface of the liquid, substantially as set forth.

5. A receptacle for volatile liquid, having its ends $k$ bulged, as shown, in combination with the other receptacle-tube and warm-water tank, substantially as set forth.

6. An oscillating tube having at each end a receptacle for volatile liquid, in combination with a tank for warm liquid, into which said receptacles dip, and a weighted rod or bar for holding each receptacle to its lowest position while being heated, the weight on said rod or bar being made adjustable, substantially as set forth.

In testimony whereof we affix our signatures in presence of two witnesses.

ANTHONY ISKE.
ALBERT ISKE.

Witnesses:
JAS. B. DONNELLY,
JOHN SCHAFFNER.